(12) United States Patent
Kermani

(10) Patent No.: US 6,895,514 B1
(45) Date of Patent: May 17, 2005

(54) METHOD AND APPARATUS FOR ACHIEVING SECURE PASSWORD ACCESS

(75) Inventor: Bahram Gaffarzadeh Kermani, Whitehall, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/344,724

(22) Filed: Jun. 25, 1999

(51) Int. Cl.$^7$ ............................... H04L 9/00; H04L 9/32; G06F 12/14; G06F 11/30
(52) U.S. Cl. ................................................... 713/202
(58) Field of Search ............................... 713/202, 183, 713/186, 187, 200

(56) References Cited

U.S. PATENT DOCUMENTS

| | | | | |
|---|---|---|---|---|
| 4,805,222 A | * | 2/1989 | Young et al. | 382/115 |
| 5,210,820 A | * | 5/1993 | Kenyon | 704/200 |
| 5,557,686 A | * | 9/1996 | Brown et al. | 382/115 |
| 5,910,989 A | * | 6/1999 | Naccache | 713/173 |
| 6,038,315 A | * | 3/2000 | Strait et al. | 713/183 |
| 6,317,834 B1 | * | 11/2001 | Gennaro et al. | 713/186 |
| 6,442,692 B1 | * | 8/2002 | Zilberman | 713/184 |

OTHER PUBLICATIONS

Merriam–Webster's Collegiate Dictionary, 1997, Merriam–Webster Incorporated, 10$^{th}$ ed., p. 850.*
Typing, Carpal Tunnel Syndrom and Ergonomic Keyboards, May 14, 1998.*
BioPassword: An Overview of Our Patented Keystroke Dynamic Technology, 1998.*

* cited by examiner

*Primary Examiner*—Andrew Caldwell
*Assistant Examiner*—Douglas J Meislahn

(57) ABSTRACT

A method and apparatus for enhancing the security of password security systems. The authorization decision related to passwords is based not only on entry of the correct characters in the correct sequence but also on the keystroke sequence timing associated with the typing habits of an authorized user. The keystroke sequence timing provides an additional security measure to each password similar to signature or fingerprint systems. Particularly, each person has a unique typing style and this uniqueness is captured in the present invention as keystroke sequence timing and used as an additional recognition means.

37 Claims, 3 Drawing Sheets

METHOD AND APPARATUS FOR ACHIEVING SECURE PASSWORD ACCESS

FIELD OF THE INVENTION

This invention generally relates to computer systems or communications systems utilizing passwords. In particular, the invention relates to the security of passwords commonly used in these computer systems or communications systems.

BACKGROUND OF THE INVENTION

Many computer systems and communication systems rely on the use of various security means, including passwords, to prevent access by unauthorized users. A password commonly is a sequence of alphanumeric characters known only to an authorized user that can be entered on a keyboard. However, as used in this specification, a password may comprise any act or series of acts that must be performed to gain access to a system and which acts are, at least presumably, known only by persons authorized to have access to the system. For instance, while a series of alphanumeric characters that may be typed on a keyboard is the most common form for a password, other types are known. For instance, various kinds of combination locks where one must punch buttons in a certain order and apparatus which require a particular series of manipulations of a handle or joystick are also known.

Successful typing of a password enables an authorized user to utilize features of the computer system or communications system. For example, in a computer system, a password may be utilized to limit access to certain databases only to authorized users. The authorized users must type in a certain character sequence (password) via a keyboard associated with said system before access will be permitted.

The passwords usually are secure means to restrict access. However, the sequence of characters in the password can be discovered by an unauthorized user. A security leak or an intentional tap can result in unauthorized and fraudulent access. Examples of these cases include: 1) visually inspecting the movement of fingers while an authorized user is entering the password; 2) looking into personal notebooks or notes; and 3) random search techniques.

There are several secured access means known in the prior art that provide additional security not provided by passwords. These secured access means include personal identification systems such as "fingerprint", "retinal image" and "voiceprint" systems. In such systems, an individual provides a sample of his or her fingerprint, eyeprint or voice such as by placing a thumb or eye on an optical scanner or speaking into a microphone coupled to a voice recognition system. "Fingerprint" and "retinal image" systems are very secure as fingerprints and retinal patterns are unique to each person and cannot be easily copied. "Voiceprint" systems are also very secure because they detect unique aspects of a person's voice.

Other secured access techniques include signature systems which operate based on an identification criteria comprising a person's signature and a verification system which carries data representative of the signature dynamics of an individual. This technique requires a reading station or a facility access station wherein a person signs his name on a surface that is equipped to read and digitize the signature. The digitized signature is compared against a reference signature stored in the verification system.

Many of the personal identification systems, including "fingerprint", "retinal image", "voiceprint", and "signature" systems, are very secure in nature, but are rather complex and expensive. They conventionally require intrusive hardware and software and significant amounts of computational time and power in order to accurately analyze and compare the necessary data to effect a recognition or approval for access.

The use of passwords is a simpler and more cost effective way to allow authorized access. However, passwords lack the necessary level of security required for many applications.

Thus, there exists a need for a method and apparatus that provides additional security of passwords, especially against theft by visual inspection or random search techniques.

SUMMARY OF THE INVENTION

The invention is a method and apparatus for enhancing the security of password security systems. In accordance with this invention, the authorization decision related to passwords is based not only on entry of the correct characters in the correct sequence (hereinafter character sequence), but also on the keystroke sequence timing associated with the typing habits of an authorized user. The keystroke sequence timing provides an additional security measure to each password similar to signature or fingerprint systems. Particularly, each person has a unique typing style and this uniqueness is captured in the present invention as keystroke sequence timing and used as an additional recognition means.

In the present invention, the correct character sequence associated with each password is predetermined and prerecorded in an adaptive system to be used as a reference with which to compare entered passwords. The keystroke sequence timing associated with the typing habit of the authorized user is also recorded in this adaptive system and used as a reference to be compared to the keystroke sequence timing when one enters a password. Keystroke sequence timing is determined by starting a timer when the user presses the first key (corresponding to the first character of the password). The timer measures the time lapse between each consecutive key stroke following the first key stroke.

The timer information as well as the entered character sequence is forwarded to the system. The adaptive system compares the character sequence of the just entered password as well as the keystroke timing to one or more stored password models. The model password(s) is made up of two features, namely keystroke sequence timing (time lapse between each key stroke) information and character sequence information.

The system administrator sets a certain minimum level of similarity of the entered password to the stored model password which will result in access being granted. Each parameter can be assigned an individual minimum accuracy level required for access to be granted. However, in an alternate embodiment, the adaptive system assigns a proportional weight to each of the two features towards the decision of granting access, the total weight being 1. Thus, if character sequence has a weight of 0.4, keystroke sequence timing has a weight of 0.6. In this embodiment, no one of the two parameters is absolutely dispositive of the decision.

DETAILED DESCRIPTION OF THE PREFERRED EMBODIMENT

Figure 1:
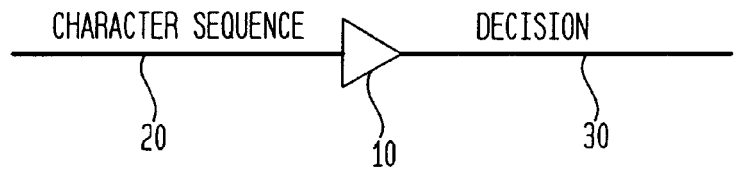
FIG. 1 is a block diagram illustrating a prior art security technique using passwords.

FIG. 1 is a block diagram illustrating a prior art security system utilizing passwords. In FIG. 1, a decision circuit 10 is linked to an input 20, and is adapted to output a PASS/FAIL response at output node 30. A user enters a unique password comprising a sequence of characters at input node 20. Input node 20 may be a keyboard for instance. A decision circuit 10 makes a determination whether access should be permitted based on this input. Typically, the decision circuit 10 compares the input character sequence to an expected response stored in the system and generates an output 30 based on that comparison. The decision output 30 may be a "PASS" (access should be granted) or a "FAIL" (access should be denied).

In the prior art, in analyzing the input character sequence, each input character of a password is compared to each character of the expected response stored in the system. A user must have 100% accuracy in the typing of the character sequence in order to "PASS". For example, if the expected response (password) is "PASSWORD", the user must type all 8 characters of "PASSWORD" in the correct order to successfully "PASS".

Figure 2:
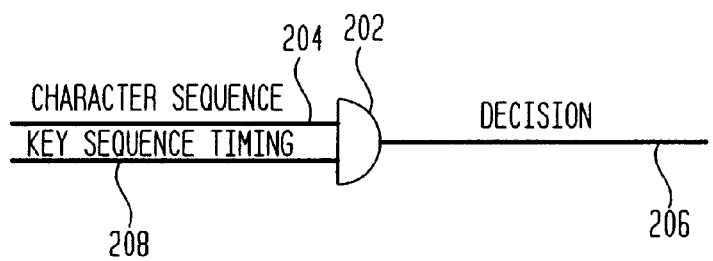
FIG. 2 is a block diagram of a circuit for developing a keystroke sequence timing model in accordance with the present invention.

FIG. 2 is a block diagram illustrating a security scheme in accordance with the present invention. Here, the decision circuit 202 makes an AND decision with two input links coupled to two input nodes 204 and 208. Input node 204 is adapted to receive an input character sequence as in the prior art. Input node 208 is adapted to receive keystroke sequence timing information. The inputs to both nodes 204 and 208 are evaluated by the decision circuit 202 to generate an output at an output node 206. The decision circuit 202 determines whether or not to grant access based on two features of the input password, namely, input character sequence and keystroke sequence timing. Both features are compared to a model password stored in the system. Based on the comparison, the output on the output node 206 may be "PASS" or "FAIL".

Prior to actual use as a security measure, the decision circuit 202 is put through a plurality of adaptive training sessions (adaptive modeling) in which the decision box 202 creates a keystroke sequence timing model to be used as a standard against which the keystroke sequence timing of an entered password is to be compared. No training is required to develop the model for the character sequence portion of the model password since it is simply a sequence of characters. However, training is essential to learn the typing habits of an authorized user in order to develop the keystroke sequence timing model portion of the password model. Particularly, while an individual's typing habits tend to be unique, the model must account for normal variations in keystroke sequence timing, since no one can enter a password with exactly the same keystroke sequence timing every time. Some variations in the typing patterns are expected and must be accounted for in the keystroke sequence timing model.

Figure 3A:
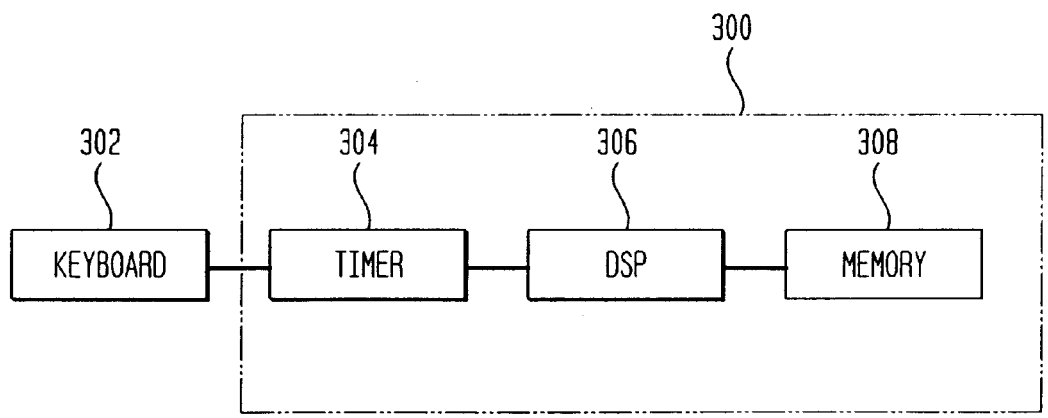
FIG. 3A is a block diagram of an exemplary circuit for developing a keystroke sequence timing model.

FIG. 3A is a block diagram of an exemplary circuit for developing a keystroke sequence timing model. In an exemplary training session, when the user at a keyboard 302 presses a first key associated with the character sequence of the password, a timer 304 is started. The timing of the following keystrokes is forwarded to a digital signal processor (DSP) 306 and recorded in a memory 308. Memory 308 may be of any memory type that is both readable and writeable, such as RAM (as illustrated), EPROM and flash memories. The recorded time points (one point for each keystroke) are T1, T2, T3 . . . TN, where N is the number of characters in the password.

In a preferred embodiment, the timer 304 is cleared after each stroke such that the timer output for each character of the password is the actual time between consecutive keystrokes. In an alternate embodiment, the timer is not cleared after each keystroke, but runs continuously for the duration of the typing of a complete password. In this case, the difference between the time value at each keystroke and the time value of the proceeding keystroke must be calculated by the DSP 308 and then recorded.

In order to create a reasonable model, a plurality of training sessions must be conducted. Particularly, the authorized person is asked to type in his or her password a plurality of times (e.g., 10 times). The DSP records the keystroke sequence timing data for each of the 10 training sessions in the memory 308. From the plurality of training sessions, the DSP calculates a mean time as well as a standard deviation for each interval and stores these values in memory 308. The mean and standard deviation values will be used, as described further below, to compare the model keystroke sequence timing to an actual keystroke sequence timing during normal use.

In one preferred embodiment, the training sessions are conducted in one sitting with the authorized user. However, in an alternate embodiment, the training sessions may continue during actual use of the system as a security measure for a certain period of time or even indefinitely. In this embodiment, every time the user types in his password, the mean and standard deviation values are recalculated and updated in order to continually adapt to the user's changing habits.

One drawback to this embodiment is that an unauthorized user who determines the character sequence of the password may be able to cause the keystroke sequence timing model to be altered to match the unauthorized user's typing habits by simply entering the character sequence of the password many times. One method for avoiding this problem is to use the keystroke sequence timing data from an access to update the model only when the attempted access results in a "PASS". In other words, if an access attempt fails, the keystroke sequence timing information from that attempt is not used to update the model (i.e., the stored mean and standard deviation values).

Figure 3B:
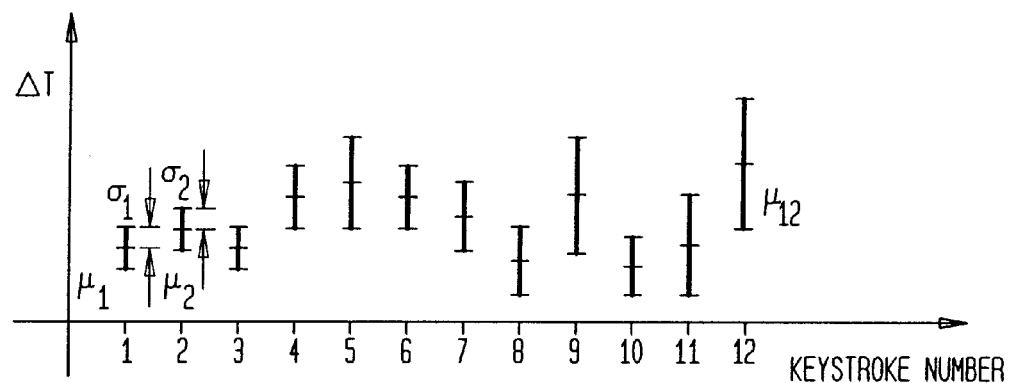
FIG. 3B is a graphical representation of a recorded keystroke sequence timing model.

FIG. 3B is a graphical representation of the recorded keystroke sequence timing model. The vertical axis represents time, T, while the horizontal axis represents the characters 1 through N of the password. As shown, each character of the password except the first character is assigned a mean time, $\mu_i$, which represents the mean time lapse between the entering of that character and the entering of the preceding character determined during training. Each of the characters except for the first also is assigned a standard deviation, $\sigma_i$, which is calculated from the plurality of training sessions in a manner well known in the art.

Once a full model of the password, including character sequence and keystroke sequence timing, is recorded, the system can be used to restrict access based on the authorized user's password character sequence and typing habits (i.e., keystroke sequence timing).

Figure 4:
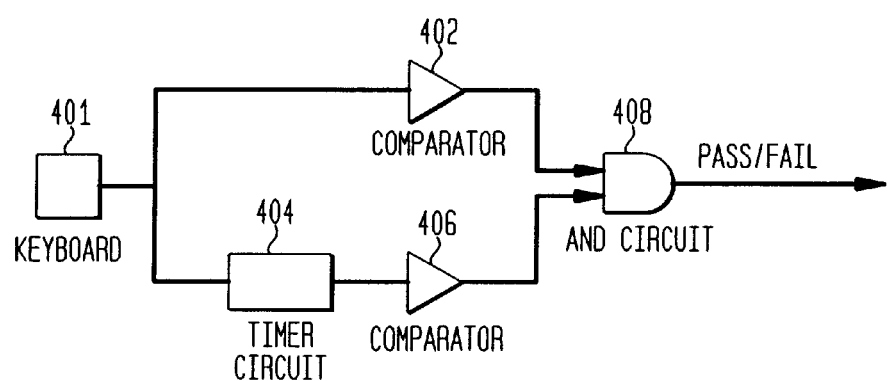
FIG. 4 is a block diagram of the decision block of FIG. 2 in accordance with one preferred embodiment of the present invention.

FIG. 4 illustrates one embodiment of the invention in which a "PASS" threshold is assigned individually to each of the two password features. The user inputs a password on keyboard 401. The character sequence of the input password is then compared by comparator circuit 402 with the character sequence portion of one or more stored model passwords. If the character sequence of the input password shares similarities with the character sequence portion of the model password sufficient to exceed the preset threshold level, the comparison circuit issues a PASS output. Otherwise, it issues a FAIL output.

The keyboard output also is sent to a timer circuit 404 which outputs keystroke sequence timing data as previously described in connection with the training sessions. A second comparison circuit 406 compares the keystroke sequence timing of the input password with the keystroke sequence timing portion of the model password. If the keystroke sequence of the input password is sufficiently similar to the keystroke sequence timing portion of the model password to exceed the preset threshold level, comparison circuit 406 issues a PASS output. Otherwise, it issues a FAIL output.

If the user enters his or her password in a manner that exceeds each of the threshold values, AND circuit 408 issues a PASS output. In a preferred embodiment, the character sequence threshold is 100%, i.e., the user must type in all characters of the password in the correct order to PASS. Alternately, the threshold may be set to allow one or more errors in the actual characters of the password.

There is a great deal of flexibility in setting a PASS threshold for the keystroke sequence timing parameter. One preferred method is described below. In this method, a keystroke sequence timing score is assigned to an input password in accordance with the equations below.

$$TS = \frac{1}{N} \sum_{i=1}^{N} \frac{1}{1+d_i} \quad \text{(Eq. 1)}$$

where

N=number of characters in a password sequence;

i=1, 2, . . . N; and $d_i$=distance of keystroke i from mean.

The distance, $d_i$, of keystroke i from the mean is given by:

$$d_i = \frac{|x_i - \mu_i|}{\sigma_i + \mu_i} \quad \text{(Eq. 2)}$$

where $x_i$=actual time lapse for key stroke i;

$\mu_i$=mean for character i of model;

$\sigma_i$=standard deviation for character i of model.

It can be seen from equation (2) that the distance $d_i$ for each character is calculated as the difference between the time lapse between the two adjacent characters as entered by the user minus the mean time lapse of model divided by the sum of the mean and the standard deviation for that character. Accordingly, if the user types in the corresponding character with the exact same time lapse as the mean time lapse of the model, then the distance calculated for that character is zero (i.e., 0 is a perfect score). As the variation from the mean increases, so does $d_i$. As can then be seen from equation (1), if the user perfectly matches the mean keystroke sequence timing value for each keystroke in the password, then he will obtain a perfect score of 1 (100%). However, for every variation from mean, $d_1$ will add some value to the denominator in equation (1), thus causing the score to drop below the perfect value of 1. The system administrator will set a threshold timing score which must be exceeded in order to pass the keystroke sequence timing portion of the two part test.

The equations above are merely exemplary. The distances, $d_i$, and timing scores, TS, can be calculated in numerous ways. The equations below are a few more examples of ways to calculate $d_i$ and TS.

Equations for Calculating a Timing score, TS $$TS = \frac{1}{N} \sum_{i=1}^{N} \left(\frac{K}{K+d_i}\right)^m \quad \text{(Eq. 1a)}$$

where k=1, 2, 3 . . . , and m=1, 2, 3 . . .

$$TS = \frac{\sqrt{\sum_{i=1}^{N} i^2}}{\sqrt{\sum_{i=1}^{N} (i+d_i)^2}} \quad \text{(Eq. 1b)}$$

$$TS = \frac{\sum_{i=1}^{N} \sqrt{k}}{\sum_{i=1}^{N} \sqrt{k+d_i^2}} \quad \text{(Eq. 1c)}$$

Equations for Calculating a Distance, $d_i$ $$d_i = \left|\frac{x_i - \mu_i}{\sigma_i + \mu_i}\right| \quad \text{(Eq. 2a)}$$

$$d_i = \left(\frac{x_i - \mu_i}{\sigma_i + \mu_i}\right)^2 \quad \text{(Eq. 2b)}$$

$$d_i = \left(\frac{x_i - \mu_i}{k\sigma_i + \mu_i}\right)^2 \quad \text{(Eq. 2c)}$$

where k=1, 2, 3 . . .

Any of equations 2, 2a, 2b and 2c for generating $d_i$ can be used in conjunction with any of equations 1, 1a, 1b and 1c for generating TS based on $d_i$. Even further methods of calculating TS and $d_i$ should be apparent to those of skill in the related arts.

In another embodiment of the invention, the two parts of the test, i.e., character sequence and keystroke sequence timing, are each assigned a weight that is interdependent on the weight of the other parameter. Only a single PASS threshold is set for an overall score that is a combination of the weighted scores corresponding to the two features. In this manner, no one of the two features is solely dispositive.

In an adaptive embodiment in which the mean and standard deviation information of the keystroke sequence timing portion of the model are continually updated, each time the user accesses the system, the weights assigned to each feature change. In particular, a first proportional weight, $W_t$, is assigned to the keystroke sequence timing feature. A second proportional weight $W_s$ is assigned to the character sequence feature.

The adaptive system assigns a first desired proportional weight ($W_t$) to the keystroke sequence timing feature and a second desired proportional weight ($W_s$) to the character sequence feature. The sum of the first and second proportional weights is equal to 1. In other words, $W_t=M$ and $W_s=1-M$, where M is a value less than 1.

At the beginning of training, the adaptive system has full knowledge of the expected character sequence of the password because the model character sequence is pre-stored in the system. However, there is no pre-recorded model of typing habits. The typing habit is a learned parameter and this information can only be gathered via a plurality of training sessions. Therefore, at the beginning, the weight, $W_t$, given to the keystroke sequence timing parameter should not be its ultimate desired value, but, instead should be close to zero. The weight $W_t=M$ should not be used until a sufficient number of training sessions have occurred. Rather, $W_t$ should start at 0 and migrate towards M as the number of training sessions increases.

As training proceeds, additional information about typing habit is gathered each time the authorized user accesses the system and the first and second proportional weights should be allowed to migrate towards their predetermined values.

In an exemplary scheme, $W_t=M$ and the $W_s=1-M$, wherein $0 \leq M \leq 1$. M is a predetermined value and is assigned by the system administrator or system designer. It signifies the relative importance of the proportional weights assigned by the adaptive system. If M is set to a value close to 1, at the end of training, the keystroke sequence timing parameter is mainly responsible for the PASS/FAIL decision. In this case, as long as the user types a sequence of keys in a highly consistent manner, even if the character sequence typed is not equal to the character sequence of the expected (model) response, the user will be allowed to access the system. On the other hand, if M is chosen to be close to 0, the final decision of the decision circuit 202 is based primarily on correct entry of the characters of the password. By setting M in the midrange (e.g., 0.51), the pass/fail decision is based evenly on character sequence and key stroke timing. As an example, assume M is chosen to be 0.2. In this case, at the end of the training sessions, $W_t=0.2$ and $W_s=0.8$. This means that 80% of the decision is based on entering the correct character sequence of the password, and 20% is based on the way the user types in the character sequence (keystroke sequence timing).

Figure 5:
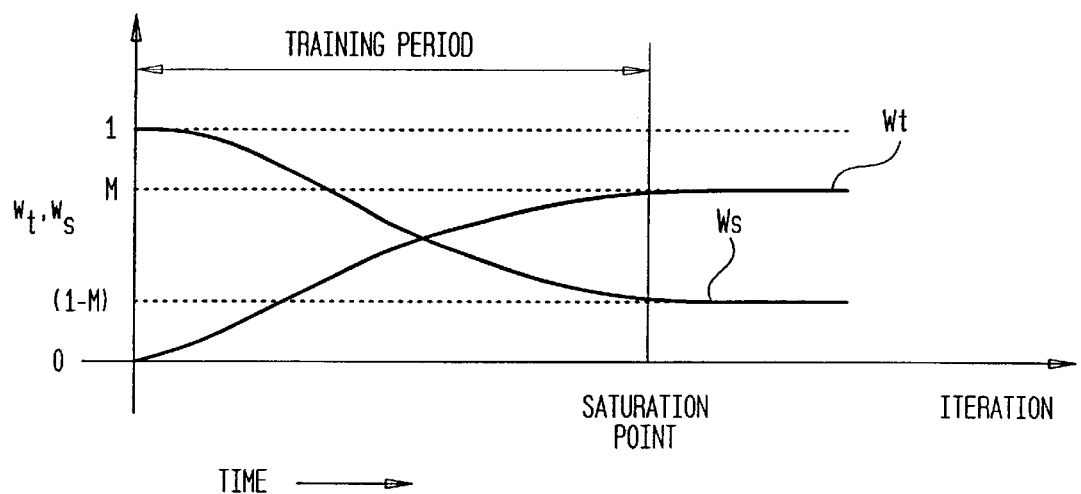
FIG. 5 is a graphical representation illustrating one potential algorithm showing how the proportional weights assigned in the present invention and the training sessions can be varied over time in accordance with one aspect of the present invention.

The algorithm for the migration of the weight $W_t$ towards its desired final value can take many forms. FIG. 5 is a graphical representation of one potential algorithm showing how the values of $W_t$ and $W_s$ may change as the number of training sessions increase. In FIG. 5, $W_t$ and $W_s$ are graphed on the Y axis (vertical) and the number of training sessions are represented on the X axis (horizontal).

Training can be halted when $W_t=M$. This is represented as the "saturation point" in FIG. 5. Alternately, as noted above, training sessions can continue indefinitely, but the values of $W_t$ and $W_s$ will be permanently set when the saturation point is reached. The number of training sessions, L, for reaching the saturation point can be set by the system administrator to any reasonable value. The number L should be set based on empirical data indicating at what sample size continued sampling no longer has any non-negligible impact on the keystroke sequence timing parameters (e.g., mean and standard deviation).

Various methods of implementing the function shown in the graph of FIG. 5 would be readily apparent to those skilled in the art and, therefore, will not be described in detail herein. The function can be implemented by software or by hardware.

In this type of scheme, there is no preset pass threshold for each parameter. Rather, the system administrator sets an overall pass threshold which may be met by any sufficient combination of the two parameters, character sequence and keystroke sequence timing.

Figure 6:
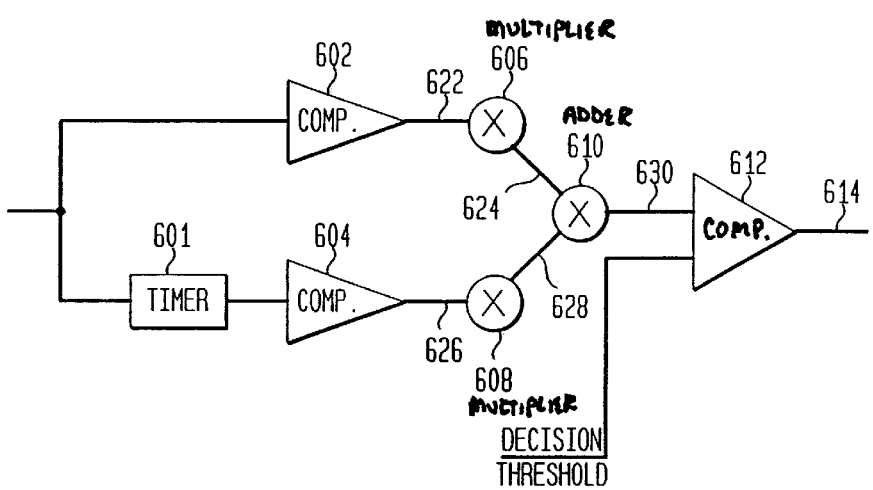
FIG. 6 is a block diagram of the decision block of FIG. 2 in accordance with a second preferred embodiment of the present invention.

FIG. 6 is a block diagram of an exemplary embodiment of circuit 202 of FIG. 2 in accordance with this embodiment of the invention. The character sequence data 204 is input to a comparison circuit 602 which compares the input character sequence data with the model character sequence data and generates a character sequence score on line 622. For instance, if the password is ten characters long and the user enters eight of the characters correctly, it is assigned a score of 80%. Likewise, the keystroke timing data 400 is fed to a second comparison circuit 604. Circuit 604 compares the input keystroke sequence timing to the model keystroke sequence timing (such as illustrated by equations (1) and (2) above) to generate a score.

Multiplier 606 multiplies the character sequence score by the weight $W_s$. Multiplier 608 multiplies the keystroke sequence timing score by weight $W_t$. Those two scores are summed in adder circuit 610 and forwarded to a first input of comparator 612. The second input of comparator 612 is coupled to receive the preset test threshold value. If the output of adder 610 exceeds that value, a PASS decision is issued on output line 614. Otherwise, a FAIL decision is issued on output line 614.

As an example, let us assume that $W_t$ is 0.3 and $W_s$ is 0.7. Let us also assume a decision threshold of 0.8 (or 80%). Accordingly, if the user inputs 8 of the 10 characters of the password correctly, comparator 602 outputs a score of 80% on line 622. Multiplier 606 multiples that value by 0.7 to arrive at an output of 0.56 (or 56%) on line 624. Let us also assume that the input keystroke sequence timing of the user results in a 60% accuracy which is output on line 626. Multiplier 608 multiples that value by 0.3 to generate an output on line 628 of 0.18 or (18%). Adder circuit 610 adds 0.56 and 0.18 to generate an output on line 630 of 0.74 (or 74%). This does not exceed the decision threshold of 80%. Accordingly, comparator 612 issues a FAIL output on line 614.

As another example, let us assume that the user inputs all 10 characters correctly. Accordingly, the score output on line 622 is 100%. That score is multiplied by W, in multiplier 606 to generate an output on line 624 of 0.7 (70%). Let us also assume that the input keystroke timing results in an output score on line 626 of only 0.5 (50%). That value is multiplied by $W_t=0.3$ to arrive at an output from multiplier 608 of 0.15 (or 15%). The sum of those values as calculated by adder 610 is 0.85, which exceeds the decision threshold of 80%. Accordingly, the output of comparator 612 is a PASS on line 614.

While FIGS. 2, 4 and 6 illustrate various embodiments of the invention in block diagram form and describe the various system components in circuit form, it should be understood that, preferably, all of the circuit functions are performed by a DSP or software running on a processor. The only exception is the timer blocks, which may more practically be implemented by a timer circuit separate from the DSP or other processor. In fact, most preferably, the present invention is implemented by an existing DSP or processor which already is embodied in the system to perform other functions, such as the functions to which access is restricted by the password scheme of the present invention.

The present invention provides a substantially increased level of security for password type security systems without the need for complex and expensive additional equipment. Further, user does not need to learn any new skill or remember any additional data in order to obtain the benefits of the additional security since the additional security is provided by the user's own inherent habits.

The present invention can be practiced with little additional cost as it utilizes the existing components of the system, such as keyboard, and existing processing means, such as a processor. Only some very simple additional software is necessary to implement (1) the determination and recording of keystroke timing information, (2) the generation of mean and standard deviation data from the keystroke sequence timing data, (3) the comparison in scoring of the keystroke timing (4) the assigning of weights, (5) adaptively varying the weights, and/or (6) summing the weighted character sequence score and keystroke timing score is minimal. Even though the present invention is described in the context of computer and communication system, it may be practiced with respect to other systems comprising traditional peripheral means such as keyboards. Passwords and the like are also commonly used to restrict access to many other things such as to restrict to certain areas of buildings or in electronic motor vehicle entry systems. The present invention is applicable to any type of system utilizing passwords.

Having thus described a few particular embodiments of the invention, various alterations, modifications, and improvements will readily occur to those of skill in the related arts. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

I claim:

1. A security method requiring entry of a password by an authorized user before an action will be allowed, said password comprising a plurality of actions in a predetermined sequence, said method comprising the steps of:

(1) creating a sequence model of an expected password, said model comprising information defining a plurality of acts occurring in a specified sequence;

(2) creating a temporal model of time intervals between said acts comprising said password;

(3) comparing the sequence model to the password entered by the user and generating a first score from a first accuracy measurement of the sequence of actions of the password entered by the user as compared to the model sequence;

(4) comparing the temporal model to time intervals of the entered password and generating a second score from a second accuracy measurement of the time intervals of the password entered by the user as compared to the model time intervals;

(5) generating a PASS/FAIL output based on a combination score calculated from said first and second scores, wherein said combination score is dynamically adjusted to increase the ratio of said second score to said first score as the number of times said authorized user enters said password increases.

2. A method as set forth in claim 1 wherein step (5) comprises:

(5.1) comparing said first score to a first threshold;
   (5.2) comparing said second score to a second threshold; and
   (5.3) generating a PASS output if and only if said first score exceeds said first threshold and said second score exceeds said second threshold.

3. A method as set forth in claim 1 wherein step (5) comprises:

(5.1) generating a first weighting factor;
   (5.2) multiplying said first score by said first weighting factor to obtain a first weighted score;
   (5.3) generating a second weighting factor;
   (5.4) multiplying said second score by said second weighting factor to obtain a second weighted score; and
   (5.5) adding said first and second weighted scores to generate an overall score and generating a PASS/FAIL output based upon said overall score.

4. A method as set forth in claim 3 wherein step (2) comprises:

(2.1) determining the time intervals between said actions forming said password as performed by an authorized user a plurality of times;
   (2.2) generating a mean and a standard deviation corresponding to each interval based on said plurality of times.

5. A method as set forth in claim 4 wherein step (4) comprises:

(4.1) comparing said mean and said standard deviation of said temporal model to the time intervals of the entered password.

6. A method as set forth in claim 5 wherein step (4.1) comprises generating said second score by:

$$TS = \frac{1}{N}\sum_{i=1}^{N} \frac{1}{1+d_i}$$

where

N+1=a number of characters in said password;

i=1, 2, . . . N; and $$d_i = \frac{|x_i - \mu_i|}{\sigma_i + \mu_i}$$

where $x_i$=the time interval for key stroke i of the password entered by the user;

$\mu_i$=the mean for character i for said temporal model; and $\sigma_i$=the standard deviation for character i of said temporal model.

7. A method as set forth in claim 5 wherein step (2.2) comprises:

recalculating said standard deviation and mean information by incorporating the time interval data corresponding to each entry of said password that results in a PASS.

8. A method as set forth in claim 4 wherein steps (2.1) and (2.2) are performed with respect to each entered password if said entered password results in a PASS.

9. A method as set forth in claim 3 wherein said second weighting factor is M and said first weighting factor is 1=M, where M is a positive fraction less than 1.

10. A security method requiring entry of a password by an authorized user before access to a system will be allowed, said password comprising a plurality of characters in a predetermined sequence, said method comprising the steps of:

(1) creating a character sequence model of an expected password sequence, said model comprising entry of a plurality of characters in a specified sequence;

(2) creating a temporal model of timing intervals between entry of consecutive characters of said password by said user;

(3) comparing the character sequence model to a character sequence measured from the password entered by the user and generating a first score from a first accuracy measurement of the character sequence relative to the character sequence model;

(4) comparing the temporal model of timing intervals to timing intervals measured from the password entered by the user and generating a second score from a second accuracy measurement of the timing intervals of the password entered by the user to the temporal model;

(5) generating a PASS/FAIL output based on a combination score calculated from of both said first and second scores, wherein said combination score is dynamically adjusted to increase the ratio of said second score to said first score as the number of times said authorized user enters said password increases.

11. A method as set forth in claim 10 wherein step (5) comprises:

(5.1) comparing said first score to a first threshold;

(5.2) comparing said second score to a second threshold; and (5.3) generating a PASS output if and only if said first score exceeds said first threshold and said second score exceeds said second threshold.

12. A method as set forth in claim 10 wherein step (5) comprises:

(5.1) generating a first weighting factor;

(5.2) multiplying said first score by said first weighting factor;

(5.3) generating a second weighting factor;

(5.4) multiplying said second score by said second weighting factor; and (5.5) adding said weighted scores to generate an overall score and generating a PASS/FAIL output based upon said overall score.

13. A method as set forth in claim 11 wherein step (2) comprises:

(2.1) generating said temporal model based on typing of said password by an authorized user a plurality of times;

(2.2) generating a mean and a standard deviation corresponding to each interval based on said plurality of times.

14. A method as set forth in claim 13 wherein step (2.2) comprises:

recalculating said mean and standard deviation information by incorporating time interval data corresponding to each entry of said password that results in a PASS.

15. A method as set forth in claim 13 wherein step (4) comprises:

(4.1) comparing said mean and said standard deviation of said temporal model to the timing intervals of the password.

16. A method as set forth in claim 15 wherein step (4.1) comprises generating said second score by:

$$TS = \frac{1}{N}\sum_{i=1}^{N} \frac{1}{1+d_i}$$

where

N+1=a number of characters in said password;

i=1, 2, . . . N; and $$d_i = \frac{|x_i - \mu_i|}{\sigma_i + \mu_i}$$

where $x_i$=the timing interval for key stroke i of the password entered by the user;

$\mu_i$=the mean for character i for said temporal model; and $\sigma_i$=the standard deviation for character i of said temporal model.

17. A method as set forth in claim 13, wherein steps (2.1) and (2.2) are performed with respect to each entered password if said entered password results in a PASS.

18. A method as set forth in claim 12 wherein said second weighting factor is M and said first weighting factor is 1−M, where M is a positive fraction less than 1.

19. An apparatus for providing password security for a system comprising:

a memory for storing a model password, said model password comprising information concerning a plurality of acts occurring in a specified sequence and measurements of the time intervals between said acts;

an input device through which a user's performance of said acts may be detected;

a first comparison circuit for comparing the specified model sequence to a sequence of a password entered by a user and generating a first score indicative of an accuracy measurement of the entered sequence to the specified model sequence;

a second comparison circuit for comparing the measurements of the time intervals of said model password to time intervals of a password entered by the user and generating a second score indicative of a second accuracy measurement of the timing intervals of the entered password to the measurements of the time intervals of the model password; and an output circuit for combining said first and second scores to create an overall score and comparing said overall score to a threshold score to generate a PASS/FAIL output signal, wherein the ratio of said second score to said first score used to create said overall score is dynamically adjusted to increase as the number of times said user's performance of said acts increases.

20. An apparatus as set forth in claim 19 wherein said output circuit comprises:

a first multiplier coupled to multiply said first score by a first weighting factor;

a second multiplier coupled to multiply said second score by a second weighting factor; and an adder coupled to receive the outputs of said first and second multipliers and output a sum thereof, said sum comprising said overall score.

21. An apparatus as set forth in claim 19 further comprising:

a circuit for generating said model password, said circuit comprising:

a timer coupled to said input device to detect intervals between said acts forming said password as performed by a user; and a circuit for generating a mean and standard deviation corresponding to each time interval of said password entered by said user based on a plurality of entries of said password to create said measurements of the time intervals of the model password.

22. An apparatus as set forth in claim 21 wherein said second comparison circuit compares said mean and said standard deviation of said model password to said time intervals of said entered password.

23. An apparatus as set forth in claim 22 wherein said circuit for generating said mean and standard deviation does so by:

$$TS = \frac{1}{N} \sum_{i=1}^{N} \frac{1}{1+d_i}$$

where

N+1=a number of characters in said password;
i=1, 2, ... N; and $$d_i = \frac{|x_i - \mu_i|}{\sigma_i + \mu_i}$$

where $x_i$=the time interval for key stroke i of the entered password entered by the user;

$\mu_i$=the mean for character i for said model password; and $\sigma_i$=the standard deviation for character i of said model password.

24. An apparatus as set forth in claim 23 wherein said circuit for generating said model password recalculates said mean and standard deviation by incorporating time interval data corresponding to each entry of said password that results in a PASS into said mean and standard deviation.

25. An apparatus as set forth in claim 24 wherein said input device is a keyboard and said acts comprise typing a sequence of characters on said keyboard.

26. An apparatus as set forth in claim 25 wherein said output circuit comprises a processor.

27. An apparatus as set forth in claim 26 wherein said circuit for generating said model password also comprises a processor.

28. An apparatus as set forth in claim 25 wherein said output circuit comprises a digital signal processor.

29. An apparatus as set forth in claim 28 wherein said circuit for generating said model password also comprises a digital signal processor.

30. A method of restricting access to a system by requiring entry of a password, said password comprising a character sequence of alphanumeric characters, said characters being typed by a user in a habitual manner by a plurality of keystrokes, each of said characters having a particular keystroke, said method comprising the steps of:

creating a model of an expected password, said model comprising a combination of a first score based upon said character sequence and a second score based upon temporal characteristics of typing habits of said user, wherein a ratio of said second score to said first score is dynamically increased as the number of times said characters are typed by said user;

receiving a user input of a password from said user;

comparing said user input to said model; and generating a PASS/FAIL output based on the comparing step.

31. A method as set forth in claim 30 wherein said step of creating a model of an expected password comprises the steps of:

recording entries of said character sequence of said password by said user a plurality of times;

determining said typing habit of said user from said recorded entries.

32. A method as set forth in claim 31 wherein said model is generated by an adaptive system trained to analyze said typing habit of said user and adaptively incorporate said typing habit in said model.

33. A method as set forth in claim 31 wherein said model is generated after conducting a series of adaptive training sessions.

34. A method as set forth in claim 30 wherein said model of said typing habits of said user comprises time intervals between said keystrokes corresponding to said characters.

35. A method as set forth in claim 30, wherein the step of creating a model of an expected password, said model comprising a combination of both said character sequence and a model of typing habits of said user, further comprises the steps of:

multiplying a first score based upon said character sequence by a first proportional weight to obtain a first factor;

multiplying a second score based upon said model of typing habits by a second proportional weight to obtain a second factor;

combining said first and second factor to obtain said model of an expected password.

36. A method as set forth in claim 35 wherein said first proportional weight and said second proportional weight are predetermined.

37. A method as set forth in claim 35 wherein a sum of said first proportional weight and said second proportional weight is equal to 1.

* * * * *